United States Patent
Butterworth

(10) Patent No.: US 7,893,986 B2
(45) Date of Patent: Feb. 22, 2011

(54) MULTIFUNCTION LENS

(75) Inventor: Mark Melvin Butterworth, Santa Clara, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 220 days.

(21) Appl. No.: 12/176,760

(22) Filed: Jul. 21, 2008

(65) Prior Publication Data

US 2009/0015688 A1 Jan. 15, 2009

Related U.S. Application Data

(63) Continuation of application No. 10/266,538, filed on Oct. 7, 2002, now Pat. No. 7,414,662.

(51) Int. Cl.
*H04N 9/68* (2006.01)
*H04N 5/225* (2006.01)

(52) U.S. Cl. .................. 348/340; 348/234; 348/374

(58) Field of Classification Search ............... None
See application file for complete search history.

(56) References Cited

U.S. PATENT DOCUMENTS

| 6,639,626 | B1 | 10/2003 | Kubo et al. |
| 6,738,510 | B2 | 5/2004 | Tsuruoka et al. |
| 6,831,692 | B1 | 12/2004 | Oda |
| 7,071,984 | B2 | 7/2006 | Kawakami |
| 2002/0101532 | A1 | 8/2002 | Takayama et al. |
| 2003/0058350 | A1 | 3/2003 | Ishimaru et al. |
| 2003/0234867 | A1 | 12/2003 | Fujita et al. |

*Primary Examiner*—Justin P Misleh
(74) *Attorney, Agent, or Firm*—RatnerPrestia

(57) ABSTRACT

An image capture apparatus and a method of image processing. The apparatus includes an image sensor array which receives light that has been reflected by a scene, a luminance photodetector which receives light from a luminance channel, a multifunction lens, and a processor. The multifunction lens includes an imaging lens portion and the luminance channel. The imaging lens portion directs the light that has been reflected in a first direction onto the image sensor array. The luminance channel includes an optical element which directs the light from the luminance channel in a second direction different from the first direction onto the luminance photodetector. The image sensor array and the luminance photodetector each convert the light they receive to image data electrical signals and luminance data electrical signals, respectively. The processor processes the image data electrical signals to form an image of the scene using the luminance data electrical signals.

7 Claims, 3 Drawing Sheets

MULTIFUNCTION LENS

This application is a Continuation of U.S. application Ser. No. 10/266,538, filed Oct. 7, 2002, now U.S. Pat. No. 7,414,662, issued on Aug. 19, 2008, the contents of which are incorporated herein by reference.

BACKGROUND

The present invention relates to digital imaging systems. More particularly, the present invention relates to a digital imaging system including a multifunction lens.

Digital imaging devices capture a scene as an image defined by a set of digital values. The captured image (as a set of digital values) can be processed for various applications. For example, to improve the quality of reproduction, various processing techniques such as flicker correction and color balancing can be applied to a captured image. To apply these techniques, information is required regarding the lighting, or luminance, of the scene at the time the scene is captured by the imaging device.

To obtain the luminance information, a light meter can be used to measure the light impinging upon the image. However, the light meter, as a separate device, does not measure the luminance of the scene at the exact instant that the scene is captured. Further, the luminance information obtained by the light meter is not immediately available to the imaging device. Some imaging devices include a built-in luminance metering system including a luminance detector and a luminance detector lens system. In such devices the luminance detector and the luminance detector lens system are separate from the main imaging sensor and imaging lens. According, the addition of the luminance detector and the luminance detector lens system to the imaging device increases costs of manufacture, increases bulk to the imaging system, and decreases reliability of the imaging system due to having additional components Consequently, there remains a need for an improved luminance detection system for imaging devices.

SUMMARY

These needs are met by the present invention. According to one aspect of the present invention, an image capture apparatus includes a multifunction lens having an imaging lens portion adapted to focus a scene onto an image sensor array and a luminance channel portion adapted to channel luminance of the scene toward a luminance photo detector.

According to another aspect of the invention, a multifunction lens includes an imaging lens portion adapted to focus a scene onto an image sensor array and a luminance channel portion adapted to channel luminance of the scene toward a luminance photo detector.

According to yet another aspect of the invention, a method of capturing an image includes the steps of capturing a scene through a multifunction lens and capturing luminance of said scene through the multifunction lens.

Other aspects and advantages of the present invention will become apparent from the following detailed description, taken in conjunction with the accompanying drawings, illustrating by way of example the principles of the invention.

DETAILED DESCRIPTION

As shown in the exemplary drawings and discussions herein below, the present invention is embodied in an image capture apparatus with a multifunction lens. The multifunction lens includes an imaging lens portion adapted to focus a scene onto an image sensor array and a luminance channel portion adapted to channel luminance of said scene toward a luminance photo detector. Due to a single piece design of the multifunction lens of the present invention, compared to the prior art built-in luminance metering system, the costs of manufacture are decreased, bulk to the imaging system is decreased, and reliability of the imaging system is increased.

Figure 1:
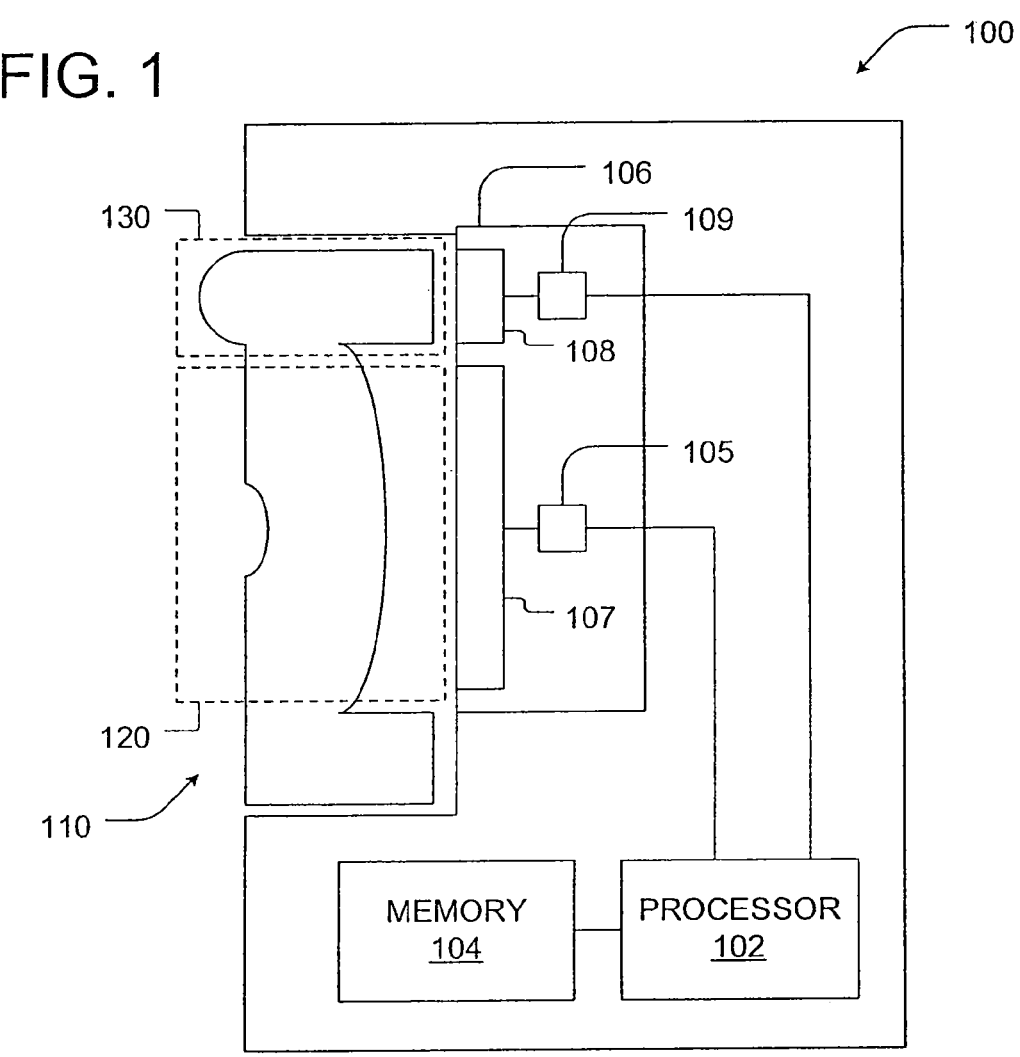
FIG. 1 is a cross sectional side view of an apparatus according to one embodiment of the present invention.

FIG. 1 is a cross sectional side view of an image capture apparatus 100 in accordance with one embodiment of the present invention. The following drawings are not necessarily to scale. This is done in order to more clearly illustrate the invention. The image capture apparatus 100 can be for example a digital camera, a cellular phone camera, a personal digital assistant camera, or a camcorder. The image capture apparatus 100 includes a processor 102, a memory 104 connected to the processor 102, an image sensor array 107 connected to an analog to digital (AD) converter 105, and a luminance photo detector 108 connected to an analog to digital converter 109. The analog to digital converters 105 and 109 are connected to the processor 102. One or more of these listed elements can be fabricated over a single substrate 106. In the illustrated embodiment, for example, the image sensor array 107, the luminance photo detector 108, and the analog to digital converters 105 and 109 are fabricated over the substrate 106. The image capture apparatus 100 further includes a multifunction lens 110.

The multifunction lens 110 has two portions. The first portion is an imaging lens portion 120. The imaging lens portion 120 is adapted to focus light from a scene to the image sensor array 107. The image sensor array 107 captures the scene as an image by converting the light into electrical signals. The electrical signals are converted into digital values by the analog to converter 105. The converted digital values are sent to the processor 102. The processor stores the image, as a set of digital values (image data), in the memory 104.

The second portion of the multifunction lens 110 is a luminance channel portion 130. The luminance channel portion 130 is adapted to channel light onto the luminance photo detector 108. The luminance photo detector 108 is adapted to detect the channeled light by converting the channeled light into electrical signals. The electrical signals are converted into digital values by the analog to digital converter 109. The converted digital values (luminance data) are sent to the processor 102. The luminance data can be used to process the image data. For example, the luminance data can be used to apply automatic white balance, flicker detection and correction to the image data and perform luminance metering. The luminance photo detector 108 can be fabricated proximal to the image sensor array 107. The luminance photo detector 108 can be fabricated at the same time as the image sensor array 107 and on the same substrate 106.

Figure 2:
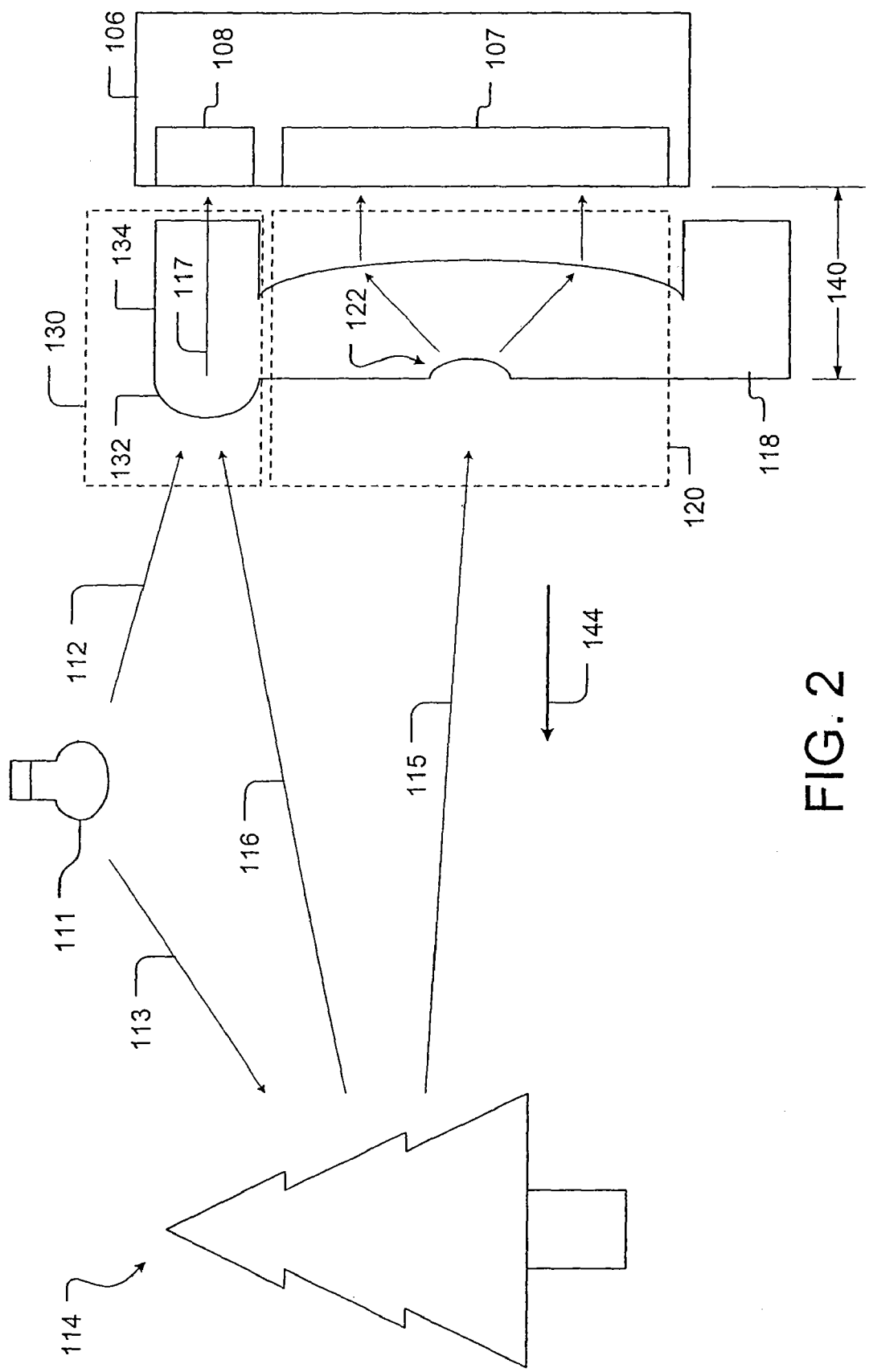
FIG. 2 is a cross sectional side view of a portion of the apparatus of FIG. 1 with additional illustrations.

FIG. 2 includes a cross sectional side view of portions of the image capture apparatus 100 of FIG. 1. Further, FIG. 2 illustrates a luminance source 111 and a sample scene 114. The scene 114 is shown, only for the purpose of illustration, as a tree 114. The scene 114 can be any scene captured by the image capture device 100. The luminance source 111 can be any source of light, for example sunlight, incandescent light, florescent light, or halogen light. The luminance source typically 111 emits light in many directions. A first portion of the light (illustrated as vector 112) from the luminance source 111 can be received by the luminance channel portion 130. A second portion of the light (illustrated as vector 113) from the luminance source 111 is directed toward the scene 114. The second portion of the light 113 is reflected by the scene 114 toward the multifunction lens 110. A first portion of the reflected light (illustrated as vector 115) is directed toward the imaging lens portion 120. A second portion of the reflected light (illustrated as vector 116) is directed toward the luminance channel portion 130. Vectors 112 through 116 and other vectors used in FIGS. 1-4 illustrate general directions of light to aid the discussion of the present invention, and are not intended to represent ray traces as is often used in the art of optics.

The first portion of the reflected light 115 enters the imaging lens portion 120 through an aperture 122. The aperture 122 focuses the reflected light 115 onto the image sensor array 107 that captures the image as already discussed.

The second portion of the reflected light 116 is received by the luminance channel portion 130. The luminance channel portion 130 includes a luminance channel lens 132 adapted to receive the second portion of the reflected light 116 and a luminance channel pipe 134 adapted to channel, or pipe, the received light toward the luminance photo detector 108. The luminance channel lens 132 can include a convex surface, as illustrated, to increase the amount of light received by the luminance channel lens 132 and to direct the received light toward the luminance channel pipe 134. For convenience, light received by the luminance channel lens 132 is illustrated as received light 117. The luminance channel pipe 134 has total internal reflection such that all received light 117 is channeled to the detector 108.

Figure 3:
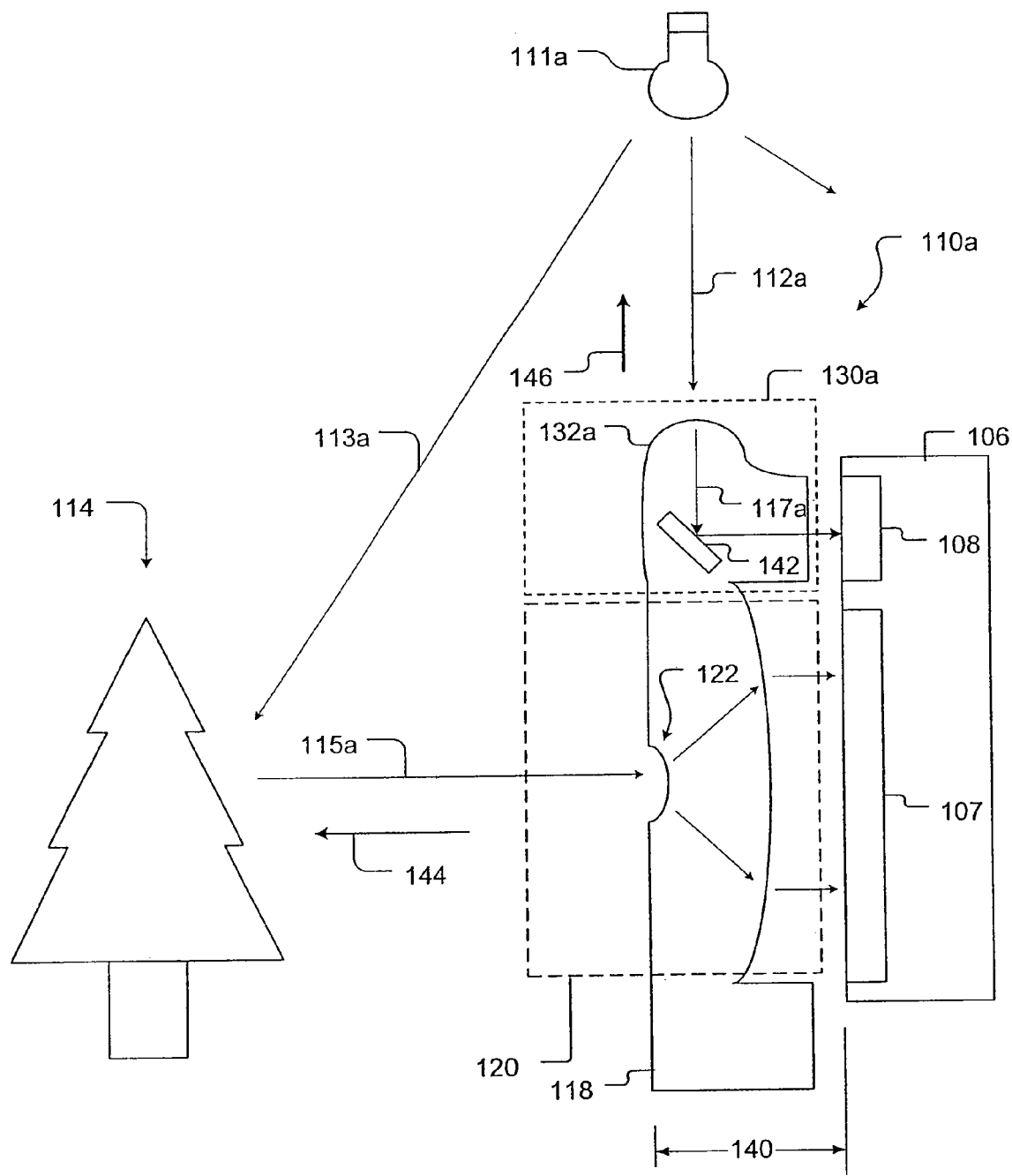
FIG. 3 is a cross sectional side view of a portion of an apparatus according to another embodiment of the present invention.

In FIG. 2, both the imaging lens 120 and the luminance channel portion 130 are directed in a first direction (illustrated by vector 144) toward the scene 114. However, this is not required. FIG. 3 illustrates another embodiment of the present invention wherein the luminance channel portion 130 is directed in a second direction (illustrated by vector 146), different than the first direction 144.

An embodiment of the present invention having a certain alternate configuration is shown in FIG. 3. Portions of this embodiment are similar to those shown in FIG. 2. For convenience, components in FIG. 3 that are similar to components in FIG. 2 are assigned the same reference numerals while analogous but changed components are assigned the same reference numerals accompanied by a letter "a". Different components are assigned different reference numerals.

FIG. 3 illustrates another embodiment of the present invention including the multifunction lens 110a having a luminance channel portion 130a. The luminance channel portion 130a is directed toward the second direction 146. Here, the first direction 114 is generally toward the scene 114 and the second direction 146 is generally toward a luminance source 111a. In the illustrated embodiment, the second direction 146 is normal to the first direction 144. However, the second direction 146 can be any direction including, as illustrated in FIG. 2, the same direction as the first direction 146. In FIG. 3, the luminance source 111a is illustrated as having a position over the multifunction lens 110 which may be the case in some instances. To direct the received light 117a to the luminance photo detector 108, an optic element 142 such as a mirror may be used within the luminance channel portion 130a.

Figure 4:
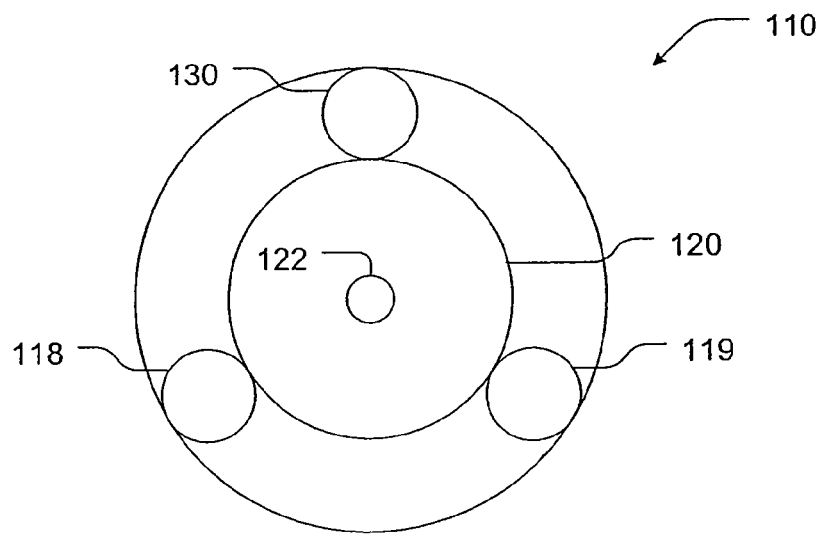
FIG. 4 is a front view of a portion of the apparatus of FIG. 1.

FIG. 4 illustrates a front view of the multifunction lens 110 in accordance to one embodiment of the present invention as illustrated in FIGS. 1 and 2. Referring to FIGS. 1, 2, and 4, the multifunction lens 110 can include one or more support legs. In FIG. 4, the multifunction lens 110 is illustrated having three support legs 118, 119, and 130 with the support leg 130 also configured and operating as the luminance channel portion 130. In fact, each of the other support legs —118 and 119—can also be configured to function as a luminance channel.

In FIGS. 1, 2, and 4, the luminance channel portion 130 is illustrated as having generally a cylindrical shape with the luminance channel lens 132 at one end of the cylinder (that is luminance channel portion 130) and the luminance photo detector 108 at the other end of the cylinder. The diameter, or thickness, of the luminance channel portion 130, the luminance channel pipe 134, or both can vary depending on implementation. For example, these portions can have a thickness ranging from 10 microns to 2000 microns. The luminance channel pipe 134 has a height that is substantially similar to the focal length 140. In fact, in the illustrated embodiment, height of the support legs 118, 119, and 130 is substantially similar to focal length 140 of the imaging lens 120. This is often the case for fixed focus imaging lens portion 120.

Luminance information received by the multifunction lens and detected by the luminance photo detector 108 is often used for improving the image data. For example, the luminance information can be used for metering the luminance of the scene 114. Further, the luminance information can be used to detect various flicker parameters such as flicker frequency, flicker levels, or both. Such flicker may be result of luminance source having an alternating-current (AC) power source having, for example, 60 Hz (in the U.S.) or 50 Hz (in Europe). Another use of the luminance information is white balancing of the captured image. In order to perform white balancing on the captured image, three luminance photo detectors can be used to detect red, green, and blue components of the luminance light. This alternative embodiment can be discussed using FIG. 4.

In an alternative embodiment, each of the support legs 118, 119, and 130 of the multifunction lens 110 can be configured as a luminance channel directing luminance information to a photo detector associated with the combined support leg-luminance channel. Further the photo detectors associated with the support legs-luminance channels 118, 119, and 130 can be configured for detection of light at a particular frequency range. For example, the detector 108 (illustrated in FIG. 1) associated with the support leg-luminance channel 130 can be adapted to detect light in a first frequency range (for example, around red color spectrum), a second detector (not illustrated) associated with the support leg-luminance channel 118 and be adapted to detect light in a second frequency range (for example, around green color spectrum), and a third detector (not illustrated) associated with the support leg-luminance channel 119 and be adapted to detect light in a third frequency range (for example, around blue color spectrum). Then, using the luminance information received by the support legs-luminance channels 118, 119, and 130 and detected by the luminance photo detectors (detector 130, the second detector, and the third detector discussed above), the captured image can be processed for color balancing. In another alternative embodiment, three or more photo detectors (for capture of Red, Green, and Blue components as well as other aspects of the luminance) can be fabricated under the single luminance channel portion 130.

From the foregoing it will be appreciated that the multifunction lens provided by the invention provides an efficient, reliable, and cost effective means of measuring luminance of a scene. The present invention integrates an imaging lens with a luminance channel lens in a relatively simple manner. In the preceding detailed description, references are made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The preceding detailed description, therefore, is not to be taken in a limiting sense, and the scope of the present invention is defined by the appended claims. In the following, claims drafted to take advantage of the "means or steps for" provision of 35 USC section 112 are identified by the phrase "means for."

What is claimed is:

1. An image capture apparatus comprising:
    an image sensor array configured to receive light from a light source that has been reflected by a scene and to convert the received light to image data electrical signals;
    a luminance photodetector configured to receive light from a luminance source and to convert the received light to luminance data electrical signals;
    a multifunction lens comprising an imaging lens portion and a luminance channel, the imaging lens portion configured to receive the light that has been reflected by the scene, the light traveling in a first direction, and to direct the light onto the image sensor array, the luminance channel including an optical element, the luminance channel configured to receive the light from the luminance source, the light traveling in a second direction different from the first direction, and to direct the light onto the luminance photodetector via the optical element; and
    a processor configured to receive the image data electrical signals from the image sensor array and the luminance data electrical signals from the luminance photodetector and to process the image data electrical signals to form an image of the scene using the luminance data electrical signals.

2. The apparatus of claim 1, wherein:
    the image sensor array further comprises a plurality of photo detectors, and
    the image sensor array and the luminance photo detector are fabricated over the same substrate, the plurality of photo detectors of the image sensor array occupy an area on the substrate and the luminance photo detector is in an area of the substrate that is distinct from and outside of the area on the substrate occupied by the image sensor array.

3. The apparatus of claim 2, wherein the luminance channel portion including the optical element is configured to direct the light from the luminance channel onto the luminance photodetector in a separate path from the light directed by the imaging lens portion onto the image sensor array.

4. The apparatus of claim 2, wherein a surface of the substrate onto which the light is directed faces the first direction.

5. The apparatus of claim 1, wherein the luminance channel is further configured to direct light that has not been reflected by the scene onto the luminance photo detector.

6. The apparatus of claim 1, wherein the first direction is normal to the second direction.

7. The apparatus of claim 1, wherein the optical element is a mirror.

\* \* \* \* \*